(No Model.)

C. E. SCRIBNER.

WINDING ARMATURES OF DYNAMO ELECTRIC MACHINES.

No. 373,948. Patented Nov. 29, 1887.

Witnesses:
Saml. B. Dover.
Wm. M. Giller.

Inventor:
Charles E. Scribner.
By George P. Barton
Att'y.

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

WINDING ARMATURES OF DYNAMO-ELECTRIC MACHINES.

SPECIFICATION forming part of Letters Patent No. 373,948, dated November 29, 1887.

Application filed December 27, 1886. Serial No. 222,693. (No model.)

*To all whom it may concern:*

Be it known that I, CHARLES E. SCRIBNER, a citizen of the United States, residing at Chicago, in the county of Cook and State of Illinois, have invented a certain new and useful Improvement in Winding Armatures of Dynamo-Electric Machines, (Case 107,) of which the following is a full, clear, concise, and exact description, reference being had to the accompanying drawings, forming a part of this specification.

My invention relates to dynamo-electric machines; and it consists in winding the different coils upon the armature in such manner that the different ends of each coil may be accessible, thus rendering the terminals of the coils accessible for testing or other purposes.

My invention will be readily understood by reference to the accompanying drawings, in which—

Figure 1:
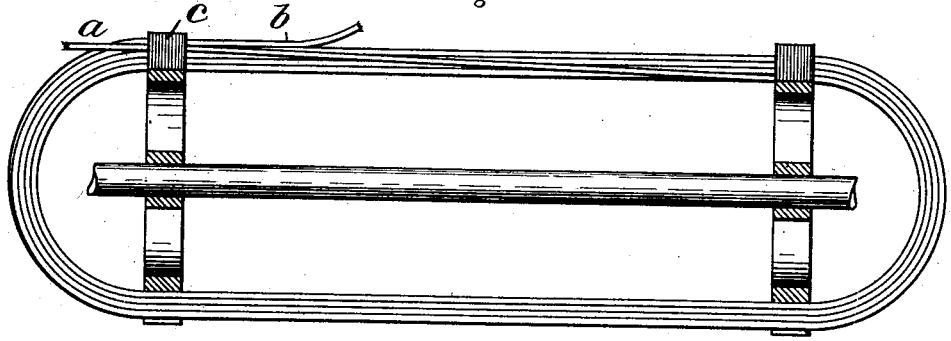
Figure 2:
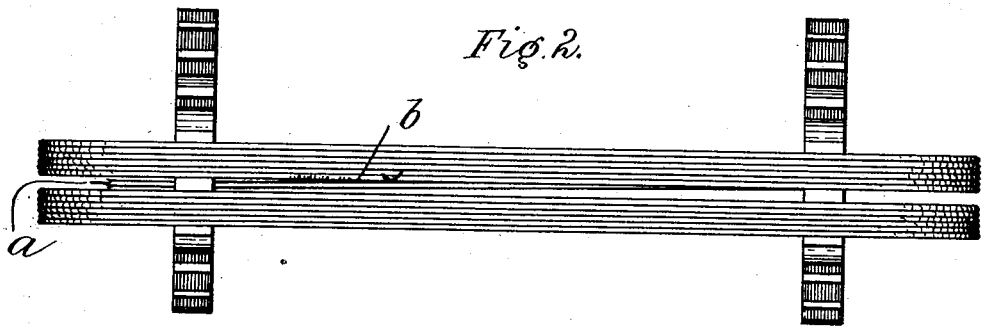
Figure 3:
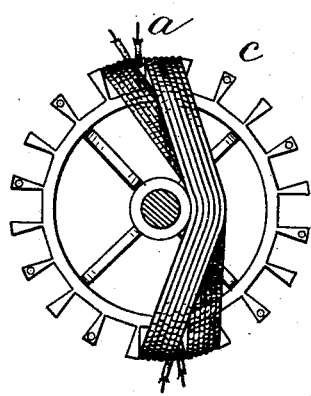

Figure 1 is a sectional view of the armature, showing one coil. Fig. 2 is a top view of the same, showing two coils. Fig. 3 is an end view of the armature with the two coils wound thereon, each alternate lug being provided with a hole through which the first ends of the wires of the different coils are inserted.

Heretofore the inner end of the coil forming one of the convolutions of the lower layer was covered by the whole coil, and the end brought out by bending up at the end of the armature. In case of a cross between this inner wire and the armature-frame, or in case of breakage of this inner end from handling or testing, a large portion of the armature was necessarily unwound to repair the fault.

In my system of winding I begin by inserting the first end $a$ of each coil in a hole in one of the lugs, leaving the end $a$ projecting, as shown in the different figures in the drawings. I then wind on the wire about the frame of the armature, as shown, until the desired number of convolutions are in place; then the last end $b$ of the coil will be found on top and near the first end $a$, as shown. By thus winding the coils upon the armature it will be seen that the end $a$ and the first half of the first convolution of each coil will be readily accessible, lying between two coils, as shown in the different figures. The different coils are separated from each other by the lugs between which they are wound, and, as described, the first end, passing through the hole in one of these separating-lugs, will come between two coils and occupy the space between the coils for a considerable portion of the length of the armature. The first and inner end of each coil is thus for nearly half a convolution made accessible for testing or resplicing in case of a break. Any coil may thus be readily tested without unwinding the armature.

In the drawings I have illustrated the rings or spiders on the armature between the projecting lugs of which the coils are wound. Each alternate lug, $c$, is provided with a hole through which is inserted the first end $a$ of one of the coils, as before described.

It is evident that the form of the spiders and the manner of winding the coil may be varied without departing from my invention, provided the end of the first convolution of each coil is connected with a lug or support, so that the coils may be accessible for testing. It is also evident that the coils may be separated from each other by lugs other than those forming a part of the rings and the inner end drawn out in the space thus provided and made accessible.

Having thus described my invention, I claim as new and desire to secure by Letters Patent—

1. In the armature of a dynamo-electric machine, the different coils or convolutions wound thereon, the first end or portion of each coil being secured near the circumference of the armature, so that the first ends or portions of the first convolutions of the different coils will lie, respectively, between the different coils, whereby the different coils are made accessible, substantially as shown and described.

2. In the armature of a dynamo-electric machine, the combination of two or more coils upon the armature with lugs or spacers supporting those coils, a leading-wire or end of each coil laid in the space between the coils and held therein by the lug or spacer, whereby the ends may be accessible for testing.

In witness whereof I hereunto subscribe my name this 3d day of November, A. D. 1886.

CHARLES E. SCRIBNER.

Witnesses:
GEORGE P. BARTON,
C. C. WOODWORTH.